United States Patent
Lindley et al.

(10) Patent No.: US 12,111,634 B2
(45) Date of Patent: Oct. 8, 2024

(54) SYSTEMS AND METHODS FOR USING INTERMEDIATE DATA TO IMPROVE SYSTEM CONTROL AND DIAGNOSTICS

(71) Applicant: Watlow Electric Manufacturing Company, St. Louis, MO (US)

(72) Inventors: Jacob Lindley, St. Louis, MO (US); Miranda Pizzella, St. Louis, MO (US); Jeremy Quandt, Winona, MN (US); Philip Schmidt, St. Louis, MO (US); John Bergen, San Jose, CA (US); Hanwen Yuan, St. Louis, MO (US); Daniel Gander, St. Louis, MO (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 79 days.

(21) Appl. No.: 17/443,595

(22) Filed: Jul. 27, 2021

(65) Prior Publication Data
US 2022/0026881 A1    Jan. 27, 2022

Related U.S. Application Data

(60) Provisional application No. 63/056,810, filed on Jul. 27, 2020.

(51) Int. Cl.
*G05B 17/00* (2006.01)
*G05B 11/42* (2006.01)
(Continued)

(52) U.S. Cl.
CPC ......... *G05B 19/4155* (2013.01); *G05B 17/00* (2013.01); *G05B 11/42* (2013.01);
(Continued)

(58) Field of Classification Search
CPC .... G05B 19/4155; G05B 17/00; G05B 11/42; G05B 2219/50333; G05B 17/02; G05D 23/1917
See application file for complete search history.

(56) References Cited

U.S. PATENT DOCUMENTS 5,396,415 A * 3/1995 Konar .................. G05B 13/027
                                                         706/903
5,625,552 A * 4/1997 Mathur ................ G05B 13/027
                                                         706/903
(Continued)

FOREIGN PATENT DOCUMENTS

CN    100582978 C    1/2010
CN    103616845 A    3/2014
(Continued)

OTHER PUBLICATIONS

Search Report issued in corresponding TW Application No. 110127588, Apr. 13, 2022. 2 pages.
(Continued)

*Primary Examiner* — Kenneth M Lo
*Assistant Examiner* — Jonathan Michael Skrzycki
(74) *Attorney, Agent, or Firm* — Burris Law, PLLC (57) ABSTRACT

A method of controlling a thermal system of an industrial process includes monitoring intermediate data, associating the intermediate data with correlation data, wherein the correlation data includes an internal process control input, an external heater control input, the output control, or a combination thereof. The method further includes generating a model that defines a relationship between the intermediate data and the correlation data, identifying a state of the heater system based on the model, and selectively performing a corrective action based on the identified state of the heater system.

27 Claims, 5 Drawing Sheets

(51) Int. Cl.
*G05B 19/4155* (2006.01)
*G05D 23/19* (2006.01)

(52) U.S. Cl.
CPC .............. *G05B 2219/50333* (2013.01); *G05D 23/1917* (2013.01)

(56) References Cited

U.S. PATENT DOCUMENTS

| | | | |
|---|---|---|---|
| 6,711,531 B1 * | 3/2004 | Tanaka | G06G 7/66 703/2 |
| 7,756,719 B2 | 7/2010 | Beck et al. | |
| 8,185,217 B2 | 5/2012 | Thiele | |
| 8,803,048 B2 | 8/2014 | Bassill et al. | |
| 9,056,342 B2 | 6/2015 | Manari | |
| 9,888,526 B2 | 2/2018 | Faulkner et al. | |
| 10,310,572 B2 | 6/2019 | Hovis et al. | |
| 10,352,745 B2 | 7/2019 | Easey et al. | |
| 11,003,150 B2 | 5/2021 | Wada et al. | |
| 2002/0040250 A1 * | 4/2002 | Gaikwad | G05B 13/042 700/39 |
| 2009/0198350 A1 * | 8/2009 | Thiele | G05B 17/02 700/83 |
| 2010/0011261 A1 | 1/2010 | Cagno et al. | |
| 2014/0337256 A1 | 11/2014 | Varadi et al. | |
| 2016/0378078 A1 | 12/2016 | Lamparter et al. | |
| 2017/0094722 A1 * | 3/2017 | Sugimoto | G06N 20/00 |
| 2021/0022212 A1 | 1/2021 | Cimino et al. | |

FOREIGN PATENT DOCUMENTS

| | | |
|---|---|---|
| CN | 207424711 U | 5/2018 |
| CN | 108196607 B | 11/2019 |
| CN | 108388205 B | 11/2019 |
| EP | 3349047 | 7/2018 |
| EP | 3506027 | 7/2019 |
| JP | 5830251 B2 | 12/2015 |
| JP | 6800074 B2 | 12/2020 |
| TW | 201841091 A | 11/2018 |
| WO | 93015448 A1 | 8/1993 |
| WO | 1997007444 A2 | 2/1997 |
| WO | 2012001213 A1 | 1/2012 |
| WO | 2019226462 A1 | 11/2019 |
| WO | 2020229810 A1 | 11/2020 |

OTHER PUBLICATIONS

International Search Report for International Application No., PCT/US2021/070972, mailed Nov. 4, 2021, 10 pages.
Communication pursuant to Article 94(3) EPC issued in corresponding EP Application No. 21 758 567.8, issued Jun. 11, 2024, 7 pages.

* cited by examiner

SYSTEMS AND METHODS FOR USING INTERMEDIATE DATA TO IMPROVE SYSTEM CONTROL AND DIAGNOSTICS

CROSS-REFERENCE TO RELATED APPLICATIONS

This application claims priority to and the benefit of U.S. Provisional Application 63/056,810 filed on Jul. 27, 2020. The content of the above application is incorporated herein by reference in its entirety.

FIELD

The present disclosure relates to a method for operating a thermal system having a process control system and a heater system.

BACKGROUND

The statements in this section merely provide background information related to the present disclosure and may not constitute prior art.

A thermal system for an industrial process typically includes a heater system and a process control system to monitor and control the operations of the heater system. The process control system may be a proportional-integral-derivative (PID) type configured to control a process variable of the heater system such as a temperature to a setpoint. The process variable is not only influenced by various factors within the thermal system, but also by external factors within the industrial process, yet outside the control of the thermal system. These external factors could be, for example, a type of wafer being heated, gases being injected into a process chamber, and/or a pressure differential within a chamber for securing a wafer to a pedestal heater, among other factors that are uncontrollable by the thermal system. While sensors and/or algorithmic calculations may be used to monitor some factors influencing the process variable, obtaining accurate and reliable data, especially for data indicative of the external factors, may be difficult for certain industrial processes.

SUMMARY

This section provides a general summary of the disclosure and is not a comprehensive disclosure of its full scope or all of its features.

The present disclosure provides a method of controlling a thermal system of an industrial process. The thermal system includes a heater system and a process control system configured to generate an output control for the heater system based on intermediate data generated by the process control system. The method includes monitoring the intermediate data, associating the intermediate data with correlation data, where the correlation data includes an internal process control input, an external heater control input, the output control, or a combination thereof. The method includes generating a model that defines a relationship between the intermediate data and the correlation data, identifying a state of the heater system based on the model, and selectively performing a corrective action based on the identified state of the heater system.

In some forms, the intermediate data includes proportional gain data, integral gain data, derivative gain data, or a combination thereof. In some forms, the output control is based on a sum of the proportional gain data, the integral gain data, and the derivative gain data. In some forms, the process control system includes a cascade control system having a primary controller and a secondary controller, and where the intermediate data includes loop data of the cascade control system. In some forms, the output control is based on a sum of proportional gain data of the secondary controller, integral gain data of the secondary controller, and derivative gain data of the secondary controller. In some forms, the intermediate data includes a controller gain of the process control system. In some forms, the model is a mathematical model, a machine learning model, or a combination thereof. In some forms, the machine learning model is a supervised learning model configured to predict the state of the heater system based on the intermediate data and the correlation data. In some forms, the method includes comparing the model with a nominal model defining a nominal relationship between the intermediate data and the correlation data and determining a deviation between the nominal model and the model, where the identified state of the heater system is further based on the deviation. In some forms, the deviation includes a proportional gain deviation, an integral gain deviation, a derivative gain deviation, or a combination thereof. In some forms, the internal process control input comprises a desired setpoint of a performance characteristic of the heater system, a setpoint for controlling the heater system, a process variable, a measured value of the process variable, an alert associated with the thermal system, or a combination thereof. In some forms, the corrective action includes controlling power to the heater system based on the identified state of the heater system. In some forms, the corrective action includes broadcasting an alert based on the identified state of the heater system, where the alert indicates a material accumulation within a conduit communicatively coupled to the process control system, a nominal thermal deviation of a resistive heating element communicatively coupled to the process control system, or a combination thereof. In some forms, the external heater control input is an output generated by an external input controller of the process control system. In some forms, the internal process control input comprises pressure data, mass flow rate data, vibration data, strain data, temperature data, or a combination thereof.

The present disclosure provides a process control system for controlling a heater system, where the process control system is configured to generate an output control for the heater system based on intermediate data generated by the process control system. The process control system includes a processor and a nontransitory computer-readable medium comprising instructions that are executable by the processor. The instructions include monitoring the intermediate data, associating the intermediate data with correlation data, where the correlation data includes an internal process control input, an external heater control input, the output control, or a combination thereof. The instructions include generating a model that defines a relationship between the intermediate data and the correlation data, identifying a state of the heater system based on the model, and selectively performing a corrective action based on the identified state of the heater system.

In some forms, the model is configured to predict the state of the heater system based on the intermediate data and the correlation data. In some forms, the instructions further include comparing the model with a nominal model defining a nominal relationship between the intermediate data and the correlation data and determining a deviation between the nominal model and the model, where the identified state of the heater system is further based on the deviation.

The present disclosure provides a method of controlling a thermal system of an industrial process. The thermal system includes a heater system and a process control system configured to generate an output control for the heater system based on intermediate data generated by the process control system. The method includes associating the intermediate data with correlation data, where the correlation data includes an internal process control input, an external heater control input, the output control, or a combination thereof. The method includes generating a model that defines a relationship between the intermediate data and the correlation data, comparing the model with a nominal model defining a nominal relationship between the intermediate data and the correlation data, identifying a state of the heater system based on the comparison between the nominal model and the model, and selectively performing a corrective action based on the identified state of the heater system.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
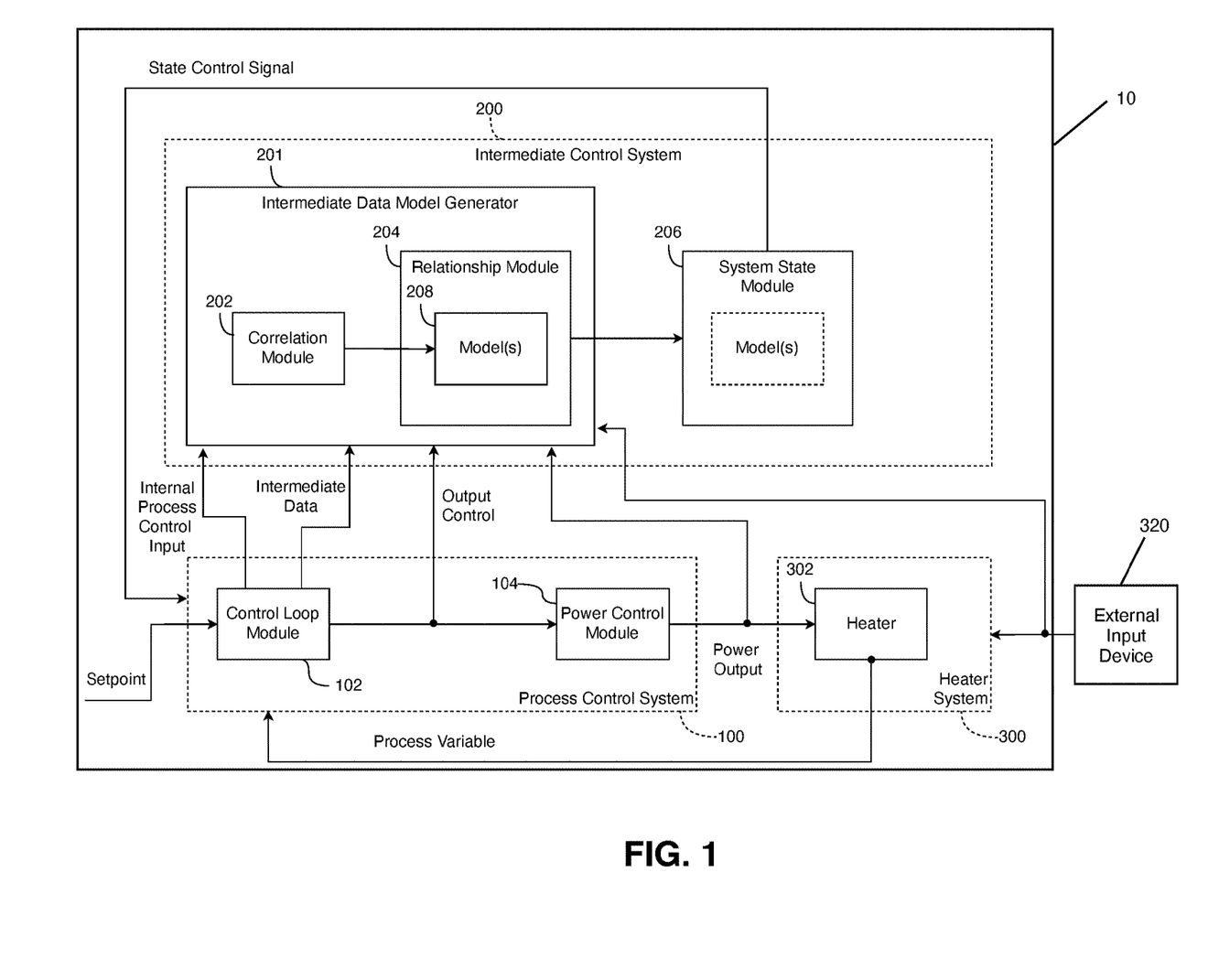
FIG. 1 is a block diagram of a thermal system having a process control system, a heater system, and an intermediate control system according to the present disclosure.

Referring to FIG. 1, a thermal system 10 including a process control system 100, an intermediate control system 200, and a heater system 300 having a heater 302 is shown. In one form, the process control system 100 is configured to control the operation of the heater system 300 and more particularly, the heater 302. As described further herein, the intermediate control system 200 of the present disclosure is configured to define a model (e.g., a mathematical model, a machine learning model, or a combination thereof) based on the intermediate data to predict a state of the heater system 300 using real-time intermediate data inputs.

The thermal system 10 may be part of various types of industrial processes for controlling a thermal characteristic of a load being heated. For example, the thermal system 10 may be part of a semiconductor process in which the heater system 300 includes a pedestal heater for heating a wafer (e.g., a load). In this example, the process control system 100 may be configured to control a thermal profile of the pedestal heater, which may vary based on external thermal controls and internal thermal controls. For example, internal thermal controls may include, but is not limited to, power provided to the pedestal heater, an operational mode of the thermal system 10 (e.g., a manual mode to control power to the heater 302 based on inputs from a user, a cold-start mode to gradually increase temperature of the pedestal heater, a steady-state mode to maintain the pedestal heater at a temperature setpoint, among other defined operation modes for controlling the heater system 300), and/or operational state of different zones of the pedestal heater when the pedestal heater is a multi-zone heater, among other parameters controllable by the thermal system 10. Examples of external thermal controls include, but are not limited to, the type of wafer being heated, gases being injected into a process chamber having the pedestal heater, and/or a pressure differential within the chamber for securing the wafer to the pedestal heater, among other factors that are uncontrollable by the thermal system 10.

In another example, the thermal system 10 may be used in an abatement system of the semiconductor process to heat fluid flowing through a network of conduits. In one form, the heater system 300 may include multiple flexible heaters that wrap around the conduits to heat the fluid therein. In yet another example, the thermal system 10 may employ cartridge heaters as part of the heating system 300 to directly heat fluid (e.g., gas and/or liquid) flowing through conduits or provided within a container.

Various process control systems 100 may be used to control the heating system 300. An example process control system 100 is disclosed in U.S. Pat. No. 10,908,195, filed Aug. 10, 2018, and titled "SYSTEM AND METHOD FOR CONTROLLING POWER TO A HEATER," which is commonly owned with the present application and the contents of which are incorporated herein by reference in its entirety. In this example process control system, a controller is configured to select a state model control defining one or more operation settings of the heater (e.g., a power-up control, a soft start control, a set rate control, and a steady-state control) and control the power supplied to the heater based on the state model control and electrical characteristic of the heater (e.g., current, voltage, or a combination thereof).

Another example process control system 100 is disclosed in co-pending application, U.S. Ser. No. 16/294,201, filed Mar. 8, 2019, and titled "CONTROL SYSTEM FOR CONTROLLING A HEATER," which is commonly owned with the present application and the contents of which are incorporated herein by reference in its entirety. In this example process control system, two or more auxiliary controllers control power to a plurality of zones of the heating system 300 based on performance characteristics of the heating system 300, and a primary controller provides an operation set-point for each heater zone based on the performance characteristics.

An additional example process control system 100 is disclosed in co-pending application, U.S. Ser. No. 16/568,757, filed Sep. 12, 2019, and titled "SYSTEM AND METHOD FOR A CLOSED-LOOP BAKE-OUT CONTROL," which is commonly owned with the present application and the contents of which are incorporated herein by reference in its entirety. In this example process control system, a controller is configured to determine an operational power level based on a measured performance characteristic of the heater, a power set-point, and a power control algorithm, and the controller is configured to determine a bake-out power level. The controller selects a power level to be applied to the heating system 300 based on the lower level from among the operational power level and the bake-out power level.

Another example process control system 100 is disclosed in co-pending application, U.S. Ser. No. 17/089,447, filed Nov. 4, 2020, and titled "CONTROL AND MONITORING SYSTEM FOR GAS DELIVERY SYSTEM," which is commonly owned with the present application and the contents of which are incorporated herein by references in its entirety. In this example, the process control system generates virtual images that visualize gasses flowing through fluid flow lines and their impact on the thermal system 10 based on virtual mapping routines, measured system data, and/or statistical analyses.

While specific applications of the thermal system 10 are provided herein, the present disclosure may be applicable to other industrial processes having a thermal system to heat a load. These applications may include, by way of example, injection molding processes, heat exchangers, exhaust gas aftertreatment systems, and energy processes, among others. Furthermore, the heater 302 of the heater system 300 should not be limited to the examples provided herein and may include other types of heater constructions such as by way of example a layered heater, a cartridge heater, a tubular heater, a polymer heater, a flexible heater, among others. In each application, the external controls and internal controls may be identified and utilized by the intermediate control system 200, as described herein.

As used herein, the term "intermediate data" refers to data generated by the process control system 100 for determining the output control. For example, the intermediate data may include proportional gain data, integral gain data, and/or derivative gain data, loop data of a cascade control system (as the process control system 100), and/or a controller gain of the process control system 100, among others.

As used herein, the term "process variable" refers to a measurable performance characteristic of the heater system 300. For example, if the heater system 300 is a two-wire heater system, as described below, the performance characteristics may include a temperature, a resistance, a voltage, and/or a current of the heater 302. In another form, the performance characteristics may be measured using discrete sensors disposed with the heater system 300. As another example, the process variable may include a power applied to the heater 302.

As used herein, the term "output control" refers to an output for controlling the process variable of the heater system 300 and is based on the intermediate data. For example, the output control may include, but is not limited to, an output of a PID control, an amount of power provided to the heater system 300, and/or other suitable parameters for controlling power to the heater system 300 and based on the intermediate data. As another example, the output control may include a sum of proportional data, integral gain data, and derivative gain data of a secondary controller of a cascaded control system (as the process control system 100).

As used herein, the term "internal process control input" refers to measured data from systems/sensors within thermal system 10 (e.g., pressure data, mass flow rate data, vibration data, strain data, temperature data, among others) and may include the process variable, a measured value of the process variable, setpoints for controlling the heater system 300, and/or performance characteristics of the heater system 300. The internal process control inputs may also include setpoints, such as a target value of the process variable, a temperature setpoint, a power setpoint, among other measurable setpoints, that can be provided by a user or defined by the process controls system 100. The internal process control input may also include data indicative of alerts issued by the thermal system 10 in response to an abnormal operation of the heater system 300.

As used herein, the term "external heater control input" refers to an input from an external input device 320, which may include an external controller and/or system that is outside of the thermal system 10. Example external input controllers 320, include, but are not limited to, feed forward controllers, sensors disposed external to the thermal system 10, control system(s) operating different sub-systems within the industrial process, human machine interfaces operable by a technician to provide information relating to an operation state of the industrial process, among other external devices/systems. In one form, the external heater control input may include, but is not limited to: an input/information from the technician; a disturbance (e.g., a diagnostic code or alert indicative of an identified abnormal operation, such as an overtemperature alarm, an overcurrent alarm, an overvoltage alarm, a leakage limit alarm, shut-down alerts, corrective action alerts, among others) within the industrial process that may affect performance of thermal system 10; data from sensors disposed outside of the thermal system 10; operational state of the external sub-system; among other external heater control inputs not controlled and/or generated by the thermal system 10.

In one form, the heater system 300 may be a two-wire heater system, where the heater 302 is operable to generate heat and operate as a sensor to measure a performance characteristic of the heater 302. For example, the heater 302 includes one or more resistive heating elements that operate as a sensor for measuring an average temperature of the resistive heating element based on a resistance of the resistive heating element. More particularly, an example of such a two-wire heater system is disclosed in U.S. Pat. No. 7,196,295, which is commonly owned with the present application and the contents of which are incorporated herein by reference in its entirety. In a two-wire system, the thermal system is a thermal system that merges heater designs with controls that incorporate power, resistance, voltage, and current in a customizable feedback control system that limits one or more these parameters (i.e., power, resistance, voltage, and current) while controlling another. In one form, the process control system 100 is configured to monitor at least one of current, voltage, and power delivered to the resistive heating element to determine resistance, and thus, temperature of the resistive heating element.

In another example application, as a two-wire heater, the heater 302 is configured to include temperature sensing power pins for measuring a temperature of the heater 302. Using the power pins as a thermocouple to measure a temperature of a resistive heating element is disclosed in Applicant's co-pending application, U.S. Ser. No. 14/725, 537, filed May 29, 2015, and titled "RESISTIVE HEATER. WITH TEMPERATURE SENSING POWER PINS," which is commonly owned with the present application and the contents of which are incorporated herein by reference in its entirety. Generally, the resistive heating element of the heater 302 and the process control system 100 are connected via a first power pin and a second power pin that define a first junction and a second junction, respectively. The first and second power pins function as thermocouple sensing pins for measuring temperature of the resistive heating element of the heater 302. The process control system, which is in communication with the first and second power pins, is configured to measure changes in voltage at the first and second junctions. More specifically, the process control system measures millivolt (mV) changes at the junctions and then uses these changes in voltage to calculate an average temperature of the resistive heating element.

In lieu of or in addition to a two-heater system, the heater system 300 may include one or more discrete sensors for measuring performance characteristics of the heater 302. For example, a temperature sensor may be provided at the heater 302 and is communicably coupled to the process control system 100 to provide the temperature measurement as a process variable. In one form, at least one of a pressure sensor, a flow rate sensor, a voltage sensor, and/or a current sensor, among others, is provided at the heater 302 to obtain a corresponding performance characteristic.

The process control system 100 is configured to control the heater system 300 based on one or more control processes that generate intermediate data to determine the output control for controlling the heater system 300. In one form, the process control system 100 includes a control loop module 102 and a power control module 104. The control loop module 102 is configured to perform the control process(es) to determine the output control based on at least one of a setpoint (temperature, power, resistance, among other measurable parameter to control the heater system) and a process variable indicative of a measurable performance characteristic of the heater system 300.

Figure 2:
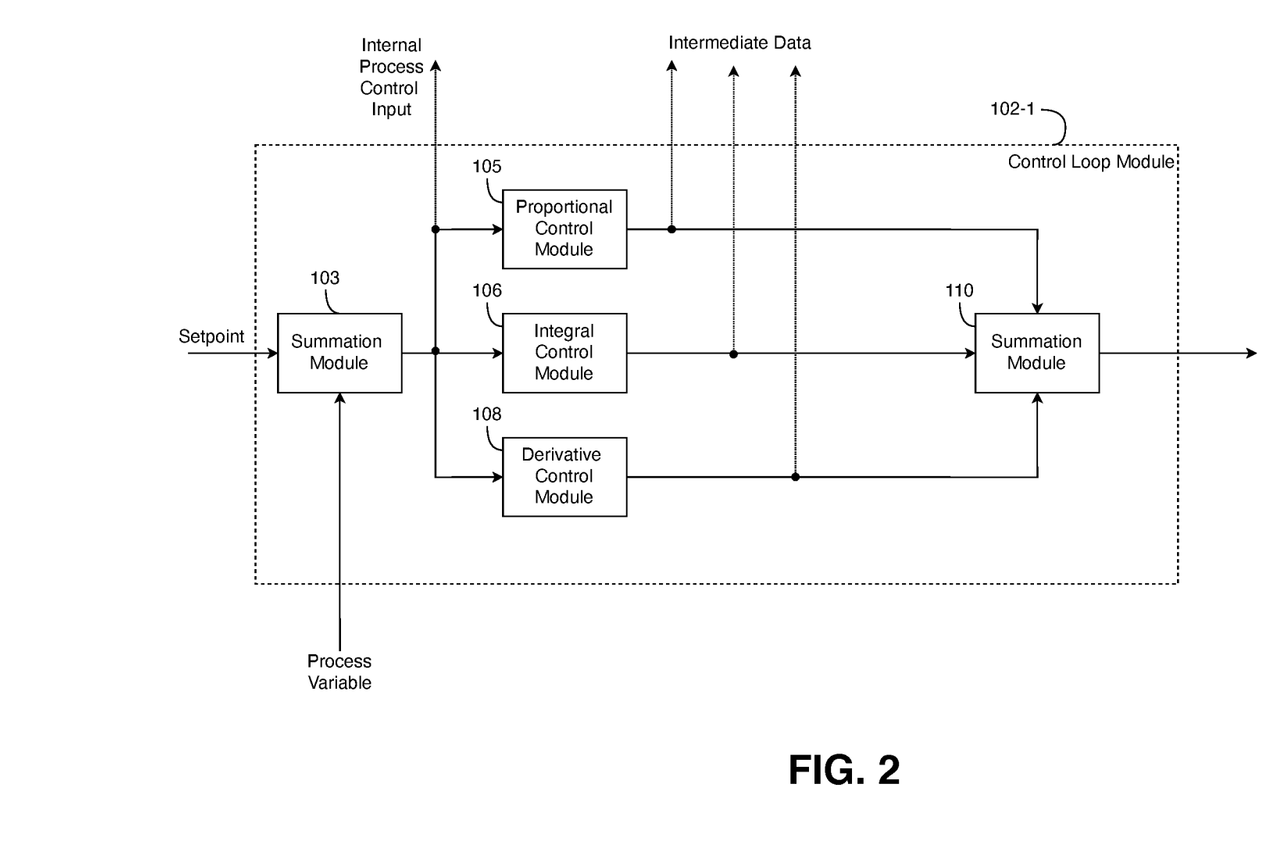
FIG. 2 is an example process control system according to the present disclosure.

In one form, referring to FIG. 2, the control loop module 102 may be provided as a control loop module 102-1 that is a PID controller including a summation module 103, a proportional control module 105, an integral control module 106, a derivative control module 108, and a summation module 110. While the control loop module 102-1 is illustrated as having the proportional control module 105, the integral control module 106, and the derivative control module 108, it should be understood that the control loop module 102-1 may not include all of these modules in other variations. For example, the control loop module may be a PI module having a proportional control module and an integral control module.

In operation, based on the setpoint and the process variable, the summation module 103 determines an error value based on the difference between the setpoint and the process variable and provides the error value to the modules 105, 106, and 108. The proportional control module 105 determines a proportional gain data, which is based on a product of the error value and a proportional gain value. The integral control module 106 determines integral gain data, which is based on a product of an integral of the error value and an integral gain value. The derivative control module 108 determines derivative gain data, which is based on a product of a derivative of the error value and a derivative gain value. In some forms, the proportional gain value, the integral gain value, and the derivative gain value may be selectively chosen in order to achieve certain response characteristics of the heater system 300, such as a particular rise time, overshoot magnitude, settling time, steady state error, among others. Subsequently, the summation module 110 provides the sum of the proportional gain data, the integral gain data, and the derivative gain data to the power control module 104, as the output control.

As a specific example, the control loop module 102-1 is configured to calculate an operational power level to be applied to the heater 302 of the heater system 300 such that the power applied to the heater 302 is approximately equal to a power setpoint. For example, in one form, the control loop module 102-1 calculates the power being supplied to the heater 302 based on the measured operation current and an input voltage applied to the heater 302 (i.e., the process variable). The summation module 103 determines the difference between the measured power being applied to the setpoint, and the proportional control module 105, the integral control module 106, and the derivative control module 108 determine the level of power needed (i.e., the operational power level) for reducing the difference between the measured power of the heater 302 and the power setpoint, as the output control.

Figure 3:
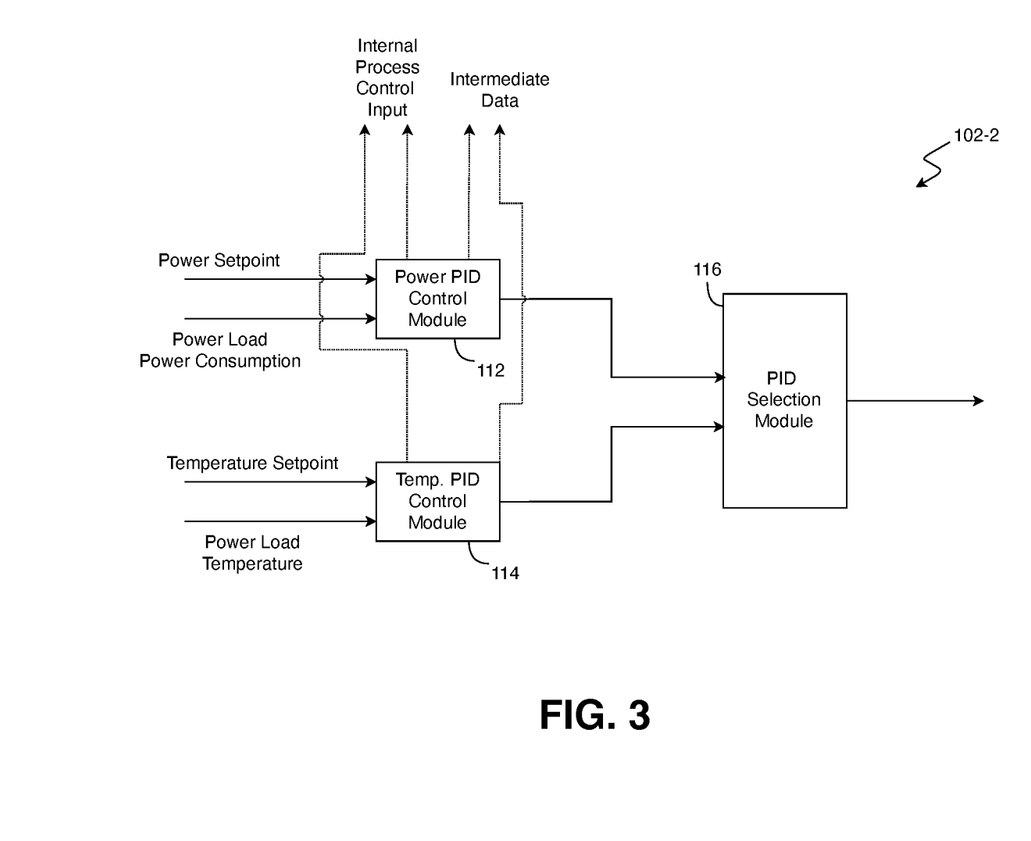
FIG. 3 is another example process control system according to the present disclosure.

As another example and as shown in FIG. 3, a control loop module 102-2, as the control loop module 102, may include a plurality of PID control modules, such as a power PID control module 112 and a temperature PID control module 114 that selectively monitor and control the heater system 300 via a PID selection module 116. The power PID control module 112 may be configured to perform the functions of the control loop module 102-1 described above with reference to FIG. 2. The temperature PID control module 114 is configured to calculate an operational temperature of the heater 302 such that the temperature of the heater 302 is approximately equal to a temperature setpoint. For example, in one form, the temperature PID control module 114 calculates the temperature of the heater 302 based on a resistance/impedance of the heater 302 and/or data from one or more temperature sensors disposed in the heater system (i.e., the process variable). The temperature PID control module 114 determines the difference between the measured temperature and the temperature setpoint, and the temperature PID control module 114 determines the level of power needed for reducing the difference between the measured temperature of the heater 302 and the temperature setpoint, as the output control.

Figure 4:
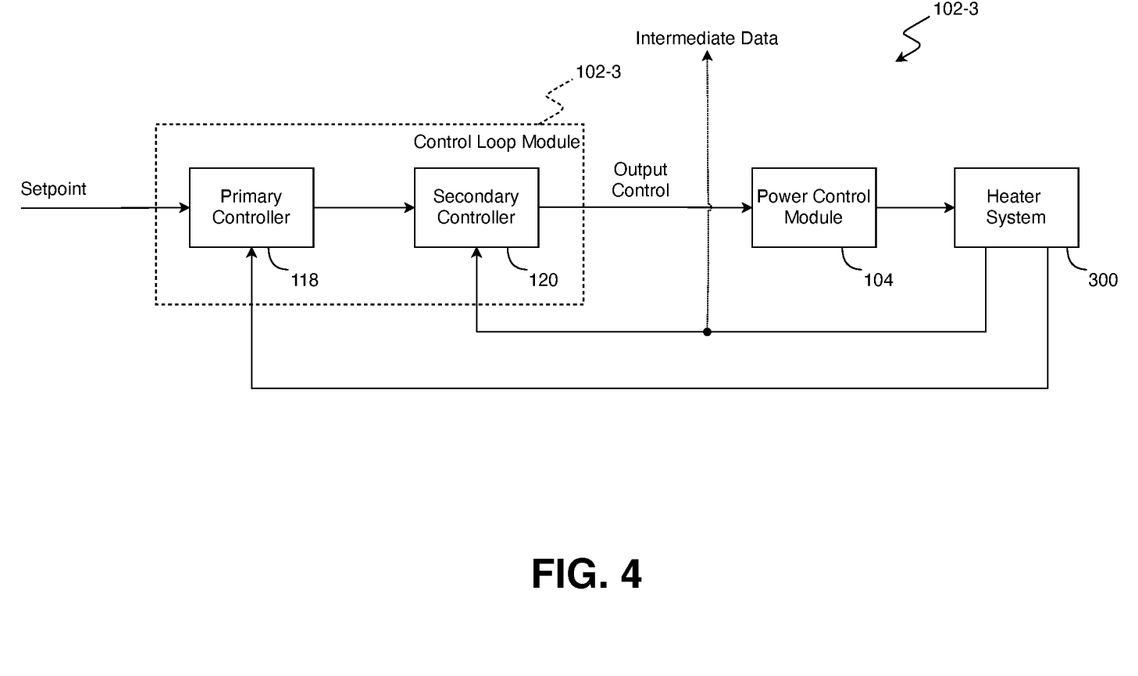
FIG. 4 is another example process control system according to the present disclosure.

As an additional example and as shown in FIG. 4, a control loop module 102-3, as the control loop module 102, includes a primary controller 118 and a secondary controller 120 that collectively form a cascaded control system. The primary controller 118 (e.g., the power PID control module 112) and the secondary controller 120 (e.g., the temperature PID control module 114) may be configured to perform the functions of the control loop module 102-1 described above with reference to FIG. 2. However, in this form, the output control of the primary controller 118 is provided to the secondary controller 120 as a setpoint variable, and the secondary controller 120 determines the difference between the setpoint variable obtained from the primary controller 118 and the process variable to generate the output control. That is, the secondary controller 120 may generate the output control based on a sum of proportional gain data of the secondary controller 120, integral gain data of the secondary controller 120, and derivative gain data of the secondary controller 120.

Referring to FIG. 1, in one form, the control loop module 102 determines the output control, or more particularly, controls power to the heater system 300 based on the state control signal from the intermediate control system. As described further herein, the state control signal identifies a state of the heater system 300 and may include instructions for controlling power to the heater system 300 based on the state. As an example, the state of heater system 300 may indicate an abnormal operation of the thermal system 10 and/or the industrial process, such as, but not limited to: a failure of the heater 302; undesirable thermal coupling between adjacent zones of the heater 302; undesirable thermal resistances of the heater 302; clogging of a fluid line of the thermal system 10; among other abnormal operations.

In the event of the state of the heater system 300 is provided as an abnormal operation, the state control signal provides information indicative of the abnormal operation and, in some cases, further provides instructions for addressing the abnormal operation such as turning off the heater system or recalibrating gain parameters of the process control system 100 to inhibit damage to the heater system 300. Thus, the control loop module 102 may change the output control to the power control module 104 to turn-off power to the heater 302 and may issue an alert (e.g., a message and/or an audio sound) indicating an abnormal operation.

Based on the output control from the control loop module 102, the power control module 104 controls power to the heater system 300. In one form, the power control module 104 is electrically coupled to a power source (not shown) and may include a power regulator circuit (not shown) to adjust the power from the power source to a selected power level and apply the adjusted power to the heater 302. Using predefined algorithms and/or table, the power control module 104 is configured to select a power level for the heater system 300 based on the output control.

While the process control system 100 is shown and described as a PID control module in FIGS. 1-4, it should be understood that the process control system 100 may be various other control loop systems. In addition, the process control system 100 may be configured to include a separate module for analyzing the state control signal from the intermediate control system 200 to determine whether a corrective action (e.g., adjust the power output to the heater system 300, issue an alert) should be performed. Furthermore, while specific modules are provided as forming the process control system 100, the process control system 100 may include other modules for controlling operations of the heater system 300, such as a diagnostic module for detecting abnormal operation of the heater system 300.

In one form, the intermediate control system 200 is configured to analyze intermediate data from the process control system 100 and the correlation data to generate one or more models (e.g., machine learning models, mathematical models, among others) that define a relationship between the intermediate data and the correlation data. More particularly, historical data sets of intermediate data and correlation data are stored and analyzed overtime to generate the model(s) and, ultimately, a system state model (i.e., a system state module) that associates an output of the model with a state of heater system 300. Once defined, real-time data inputs (i.e., real-time intermediate data and correlation data) are analyzed by the model(s) and the system state module to determine a state of the heater system 300, and the intermediate control system provides and outputs a state control signal to the process control system 100 to control the output control signal to the heater 302. In the following, intermediate data and correlation data may collectively be referred to as "intermediate-correlation data." To perform the functions described herein, the intermediate control system 200 of the present disclosure may include one or more databases for storing historical intermediate-correlation data and/or real-time intermediate-correlation data, a communication infrastructure for exchanging data with external systems like the process control system 100, and a computing system for processing the intermediate-correlation data.

In one form, the intermediate control system 200 includes an intermediate data model generator 201, which includes a correlation module 202 and a relationship module 204, and a system state module 206. In one form, the correlation module 202 is configured to obtain the intermediate data (e.g., proportional gain values, integral gain values, derivative gain values) and the correlation data (e.g., the internal process control input, the output control and/or the external heater control input) and store the intermediate data and the correlation data in a database (not shown) in an associated manner based on, for example, a timestamp of the intermediate-correlation data. As an example, proportional gain values, integral gain values, and/or derivative gain values (collectively as PID values) from the control loop module 102 is associatively stored with data from sensors (not shown) disposed within the thermal system 10 and/or the industrial process and with alerts issued within the industrial process and/or the thermal system.

In one form, the relationship module 204 is configured to determine a relationship or more particularly, a model(s) 208 between the intermediate-correlation data. That is, using suitable data modeling techniques, the relationship module 204 identifies trends/relationship between the intermediate-correlation data. As an example, the relationship module 204 is configured to perform various supervised machine learning routines, such as a linear, nonlinear, or logistic regression routine, a random forest routine, a support vector routine, among others, to generate a nominal model (as the model(s) 208) defining a nominal relationship between the intermediate data and the correlation data (e.g., a nonlinear regression indicating a predicted proportional gain value over time) during a training routine. Additionally, the relationship module 204 may be configured to perform the supervised machine learning routines to generate supervised learning models (as the model(s) 208) indicating the relationship between the real-time intermediate-correlation data. It should be understood that the relationship module 204 may perform unsupervised or semi-supervised learning routines to generate the model(s) 208 (e.g., a clustering routine).

Based on the model(s) 208, the intermediate data model generator 201 defines the system state module 206 to be employed for analyzing real-time intermediate-correlation data. In one form, the intermediate data model generator 201 continues to analyze intermediate-correlation data to refine models and, further, the system state module 206. While the system state module 206 is provided as part of the intermediate control system 200, once defined, the system state module 206 may be employed with the process control system 100 to improve a response time of the real-time analysis.

In one form, the system state module 206 associates possible outputs of the model(s) 208 with one or more defined states of the heater system 300. The system state module 206 processes the real-time intermediate-correlation data using the models stored therein to identify a state of the heater system 300 from among multiple defined states and transmits the identified state as the state control signal. In an example application, the system state module 206 may identify a state of the heater 302 based on the change as a function of time and adjust one of the proportional gain values, integral gain values, and derivative gain values accordingly. To perform the functionality described herein, it should be understood that the system state module 206 may iteratively perform a machine learning training routine to associate the outputs of the model(s) 208 with defined states of the heater system 300. As an example, the machine learning training routine may be a supervised learning routine that includes tagging training data with various states of the heater system 300, such as an amount of fluid accumulation in a fluid flow system, a thermal deviation of a resistive heating element of the heater system 300, a non-matching tool condition of the heater system 300, among other heater system states.

As an example, the models 208 may define a change between multiple iterations of the intermediate data as a function of timer data, and the system state module 206 may identify a state of the heater system 300 based on the change as a function of time and adjust one of the proportional gain values, integral gain values, and derivative gain values accordingly. For instance, the system state module 206 may determine that a significant change between two or more iterations of the proportional gain value of the mathematical model (as the model 208) indicates that the heater system 300 is consuming excessive electrical power, as the state of the heater system 300. Accordingly, the system state module 206 may transmit a state control signal indicating a state associated with the proportional gain value change (e.g., an undesirable thermal coupling of the heater system 300). Furthermore, the state control signal may instruct the process control system 100 to adjust (e.g., increase/decrease) the proportional gain value.

As another example, when the process control system 100 executes a temperature control routine, the control loop module 102 may execute an autotune routine that utilizes a response of the heater system 300 to select appropriate proportional gain values, integral gain values, and/or derivative gain values (collectively referred to as PID gain values). The autotune routine may be periodically executed, and the PID gain values may be recorded each time the autotune routine is executed. The system state module 206 may be configured determine that a deviation in at least one of the PID gain values compared to a nominal model of the PID gain values over time indicates a change in the thermal response of the heater system 300, such as heater insulation breakdown, fluid accumulation in a conduit of the fluid flow system coupled to the heater system 300, among other thermal responses identified for a particular application of the thermal system 10, as the state of the heater system 300.

As yet another example, with the correlation data including the output control and alerts issued by the thermal system 10 and/or the industrial process, the relationship module 204 may associate the intermediate data with the output control and/or the alert data and determine a corresponding model for predicting future alerts. The system state module 206 may then identify a state of the heater 302 as a possible alert and provide a corrective action based on the alert. For instance, the system state module 206 may determine based on a supervised machine learning model that when generating an output control to heat a target of the fluid flow system to a particular setpoint temperature, the heater system 300 frequently initiates an emergency shut down protocol and generates a shut-down alert. Accordingly, the system state module 206 may transmit a state control signal identifying a possible shut-down, as the state of the heater system 300, and instructions to adjust at least one of the PID gain values to inhibit the likelihood of the shut-down.

While the process control system 100, the intermediate control system 200, and the heater system 300 are shown as separate systems, it should be understood that at least one of the process control system 100, the intermediate control system 200, and the heater system 300 may be implemented as a single system. For example, the intermediate control system 200 may be provided as part of the process control system 100. In one form, the intermediate control system may be disposed at a different location from that of the process control system 100 and may communicate with the process control system 100 via a wireless communication network, one more edge computing devices disposed within the thermal system 10, or a combination thereof.

Figure 5:
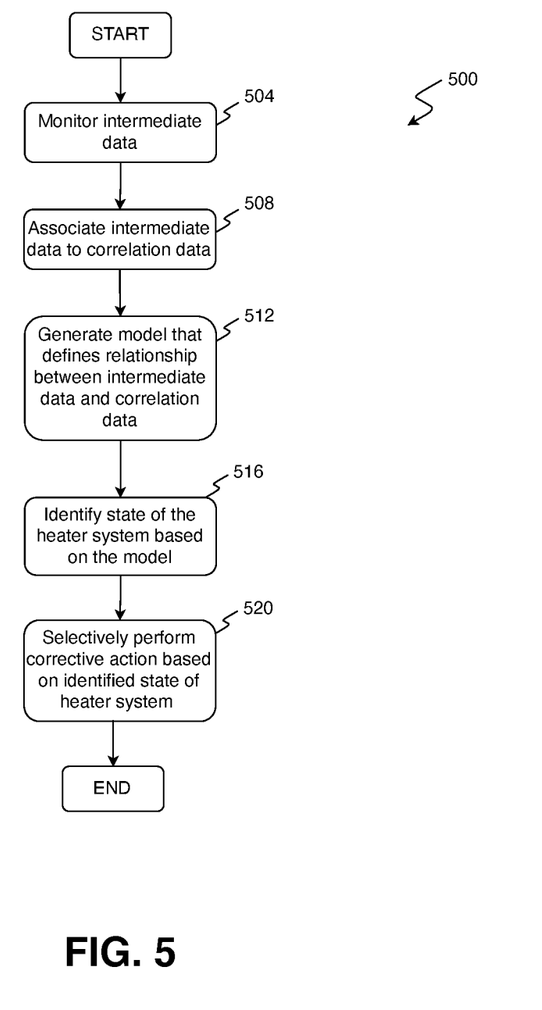
FIG. 5 is a flowchart for operating the thermal system having the intermediate control system according to the present disclosure.

With reference to FIG. 5, a flowchart illustrating an example routine 500 for controlling a heater system using the intermediate control system of the present disclosure is shown. At 504, the intermediate control system monitors the intermediate data generated by the process control system 100. At 508, the intermediate control system 200 associates the intermediate data to the correlation data. As an example, at 508, the intermediate control system associates the PID gain data to an output control indicating a request to set the heater 303 to a particular temperature or an output control indicating a request to provide a particular voltage and/or current value to the heater 302. As another example, at 508, the intermediate control system 200 associates the PID gain data to an external heater control input from the external input device 320 indicating a semiconductor tool matching of the heater system 300. As yet another example, at 508, the intermediate control system 200 associates the PID gain data to an external heater control input from external input device 320, which is provided a separate heater system included within a network of heater systems.

At 512, the intermediate control system 200 determines a model to define a relationship between the intermediate data and the correlation data. At 516, the intermediate control system 200 identifies the state of the heater system based on the model. As an example, at 516, the intermediate control system 200 may detect an amount of fluid accumulation in a fluid flow system, a thermal deviation of a resistive heating element of the heater system, a non-matching tool condition, among others. At 520, the intermediate control system 200 selectively performs a corrective action based on the identified state of the heater system 300, such as controlling the power provided to the heater system 300 based on the identified state.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

Spatial and functional relationships between elements are described using various terms, including "connected," "engaged," "coupled," "adjacent," "next to," "on top of," "above," "below," and "disposed." Unless explicitly being described as being "direct," when a relationship between first and second elements is described in the present disclosure, that relationship can be a direct relationship where no other intervening elements are present between the first and second elements, and can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, the term "module" may be replaced with the term "circuit". The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term code may include software, firmware, and/or microcode, and may refer to programs, routines, functions, classes, data structures, and/or objects. The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and nontransitory.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of controlling a thermal system of an industrial process, the thermal system including a heater system and a process control system configured to generate an output control for the heater system based on intermediate data generated by the process control system, the method comprising:
   monitoring the intermediate data;
   associating the intermediate data with correlation data, wherein the correlation data is associated with the output control, and wherein the intermediate data comprises one or more of: proportional gain data, integral gain data, or derivative gain data;
   generating a supervised learning model that defines a relationship between the intermediate data and the correlation data;
   predicting a state of the heater system based on the supervised learning model; and
   selectively performing a corrective action based on the predicted state of the heater system, wherein the corrective action includes controlling power to the heater system based on the predicted state of the heater system.

2. The method of claim 1, wherein the correlation data includes an internal process control input or an external heater control input.

3. The method of claim 1, wherein the output control is based on a sum of the proportional gain data, the integral gain data, and the derivative gain data.

4. The method of claim 1, wherein the process control system includes a cascade control system having a primary controller and a secondary controller, and wherein the intermediate data includes loop data of the cascade control system.

5. The method of claim 4, wherein the output control is based on a sum of proportional gain data of the secondary controller, integral gain data of the secondary controller, and derivative gain data of the secondary controller.

6. The method of claim 1, wherein the intermediate data includes a controller gain of the process control system.

7. The method of claim 1, wherein the model is one or more of a mathematical model or a machine learning model.

8. The method of claim 1 further comprising:
   comparing the model with a nominal model defining a nominal relationship between the intermediate data and the correlation data; and
   determining a deviation between the nominal model and the model, wherein the predicted state of the heater system is further based on the deviation.

9. The method of claim 8, wherein the deviation includes a proportional gain deviation, an integral gain deviation, or a derivative gain deviation.

10. The method of claim 1, wherein the correlation data comprises an internal process control input that comprises a desired setpoint of a performance characteristic of the heater system, a setpoint for controlling the heater system, a process variable, a measured value of the process variable, or an alert associated with the thermal system.

11. The method of claim 10, wherein the internal process control input comprises pressure data, mass flow rate data, vibration data, strain data, or temperature data.

12. The method of claim 1, wherein the corrective action includes controlling power to the heater system based on the predicted of the heater system.

13. The method of claim 1, wherein the corrective action includes broadcasting an alert based on the predicted state of the heater system, wherein the alert indicates a material accumulation within a conduit communicatively coupled to the process control system, or a nominal thermal deviation of a resistive heating element communicatively coupled to the process control system.

14. The method of claim 1, wherein the correlation data comprises an external heater control input that is an output generated by an external device of the process control system.

15. A process control system for controlling a heater system, the process control system configured to generate an output control for the heater system based on intermediate data generated by the process control system, the process control system comprising:
   a processor; and
   a nontransitory computer-readable medium comprising instructions that are executable by the processor, wherein the instructions comprise:
      monitoring the intermediate data;
      associating the intermediate data with correlation data, wherein the correlation data is associated with the output control, and wherein the intermediate data comprises one or more of: proportional gain data, integral gain data, or derivative gain data;
      generating a supervised learning model that defines a relationship between the intermediate data and the correlation data;
      predicting identifying a state of the heater system based on the supervised learning model; and
      selectively performing a corrective action based on the predicted state of the heater system, wherein the corrective action includes controlling power to the heater system based on the predicted state of the heater system.

16. The process control system of claim 15, wherein the correlation data includes an internal process control input or an external heater control input.

17. The process control system of claim 15, wherein the process control system includes a cascade control system having a primary controller and a secondary controller, and wherein the intermediate data includes loop data of the cascade control system.

18. The process control system of claim 15, wherein:
   the model is configured to predict the state of the heater system based on the intermediate data and the correlation data; and
   the instructions further comprise:
      comparing the model with a nominal model defining a nominal relationship between the intermediate data and the correlation data; and determining a deviation between the nominal model and the model, wherein the predicted state of the heater system is further based on the deviation.

19. The process control system of claim 15, wherein the correlation data includes the output control, wherein the output control comprises an internal process control input that comprises a desired setpoint of a performance characteristic of the heater system, a setpoint for controlling the heater system, a process variable, a measured value of the process variable, or an alert associated with a thermal system.

20. The process control system of claim 15, wherein the output control is based on a sum of the proportional gain data, the integral gain data, and the derivative gain data.

21. A method of controlling a thermal system of an industrial process, the thermal system including a heater system and a process control system configured to generate an output control for the heater system based on intermediate data generated by the process control system, the method comprising:
associating the intermediate data with correlation data, wherein the correlation data is associated with the output control, and wherein the intermediate data comprises one or more of: proportional gain data, integral gain data, or derivative gain data;
generating a supervised learning model that defines a relationship between the intermediate data and the correlation data;
comparing the model with a nominal model defining a nominal relationship between the intermediate data and the correlation data;
predicting a state of the heater system based on the comparison between the nominal model and the model; and
selectively performing a corrective action based on the predicted state of the heater system, wherein the corrective action includes controlling power to the heater system based on the predicted state of the heater system.

22. The method of claim 21, wherein the correlation data includes an internal process control input or an external heater control input.

23. The method of claim 21, wherein the process control system includes a cascade control system having a primary controller and a secondary controller, and wherein the intermediate data includes loop data of the cascade control system.

24. The method of claim 21, wherein the predicted state of the heater system is further based on a deviation between the nominal model and the model, and wherein the deviation includes a proportional gain deviation, an integral gain deviation, or a derivative gain deviation.

25. The method of claim 21, wherein the correlation data comprises an internal process control input that comprises a desired setpoint of a performance characteristic of the heater system, a setpoint for controlling the heater system, a process variable, a measured value of the process variable, or an alert associated with the thermal system.

26. The method of claim 25, wherein the internal process control input comprises pressure data, mass flow rate data, vibration data, strain data, or temperature data.

27. The method of claim 21, wherein the correlation data comprises an external heater control input that is an output generated by an external input controller of the process control system.

* * * * *